(12) United States Patent
Kato et al.

(10) Patent No.: US 10,913,213 B2
(45) Date of Patent: Feb. 9, 2021

(54) DEVICE FOR ATTACHING MOUTHPIECE TO INNERLINER OF AIRCRAFT WATER TANK

(71) Applicant: The Yokohama Rubber Co., LTD., Tokyo (JP)

(72) Inventors: Hayato Kato, Hiratsuka (JP); Takahiro Ozawa, Hiratsuka (JP)

(73) Assignee: The Yokohama Rubber Co., LTD.

( * ) Notice: Subject to any disclaimer, the term of this patent is extended or adjusted under 35 U.S.C. 154(b) by 50 days.

(21) Appl. No.: 16/469,606

(22) PCT Filed: Dec. 11, 2017

(86) PCT No.: PCT/JP2017/044404
§ 371 (c)(1),
(2) Date: Jun. 13, 2019

(87) PCT Pub. No.: WO2018/110508
PCT Pub. Date: Jun. 21, 2018

(65) Prior Publication Data
US 2020/0079030 A1    Mar. 12, 2020

(30) Foreign Application Priority Data
Dec. 13, 2016   (JP) ................................. 2016-241188

(51) Int. Cl.
*B29C 65/48*   (2006.01)
*B64F 5/10*    (2017.01)
(Continued)

(52) U.S. Cl.
CPC ............... *B29C 65/48* (2013.01); *B64F 5/10* (2017.01); *B65D 88/14* (2013.01); *B65D 90/54* (2013.01); *B29L 2031/712* (2013.01)

(58) Field of Classification Search
CPC .......... B29C 65/70; B29C 65/48; F16J 13/12; F17C 2203/0604; B65D 90/54
(Continued)

(56) References Cited

U.S. PATENT DOCUMENTS 5,556,497 A * 9/1996 Murphy .................. B29C 66/80
156/172
6,793,095 B1 * 9/2004 Dulisse ............. B29C 66/12469
220/612

(Continued)

FOREIGN PATENT DOCUMENTS

| JP | H11-210988 | 8/1999 |
| JP | 2001-304492 | 10/2001 |

(Continued)

OTHER PUBLICATIONS

International Search Report for International Application No. PCT/JP2017/044404 dated Feb. 6, 2018, 4 pages, Japan.

*Primary Examiner* — Matthew J Daniels
*Assistant Examiner* — Hana C Page
(74) *Attorney, Agent, or Firm* — Thorpe North & Western

(57) ABSTRACT

When a cylinder portion of an innerliner is positioned inside a mouthpiece and when an upper mold and a lower mold are brought together, a projection portion is provided on an outer circumferential member of the lower mold that closes a gap between a section of an upper mold side positioning outer circumferential surface following on from an inner circumferential end of an outer abutting surface and a portion of the innerliner where an inner circumferential surface abuts. As a result, the portion of the innerliner that is thermally deformed is prevented from being displaced radially inward of the mouthpiece along a first annular surface.

10 Claims, 15 Drawing Sheets

(51) Int. Cl.
   *B65D 88/14*    (2006.01)
   *B65D 90/54*    (2006.01)
   *B29L 31/00*    (2006.01)
   *B29C 65/70*    (2006.01)

(58) Field of Classification Search
   USPC .......................................................... 156/500
   See application file for complete search history.

(56) References Cited

U.S. PATENT DOCUMENTS

| | | | |
|---|---|---|---|
| 2008/0113132 A1* | 5/2008 | Lungershausen | B29C 49/20 |
| | | | 428/35.7 |
| 2012/0273508 A1 | 11/2012 | Haseloh et al. | |
| 2018/0142839 A1 | 5/2018 | Taguchi et al. | |
| 2019/0170300 A1* | 6/2019 | Cola | F17C 1/16 |

FOREIGN PATENT DOCUMENTS

| | | |
|---|---|---|
| JP | 2009-285691 | 12/2009 |
| JP | 2011-251736 | 12/2011 |
| WO | WO 2016/194574 | 12/2016 |

* cited by examiner

FIG. 12A
FIG. 12C
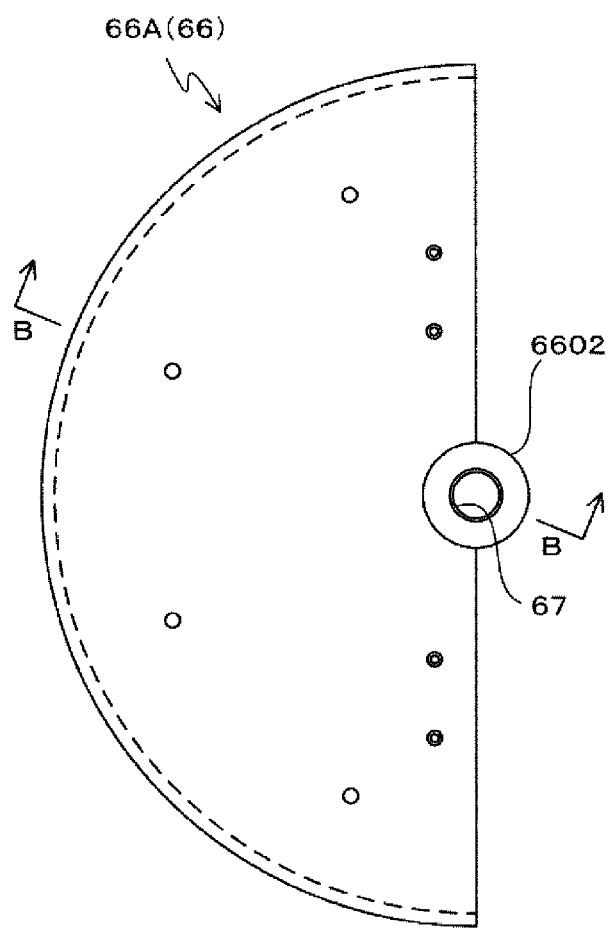
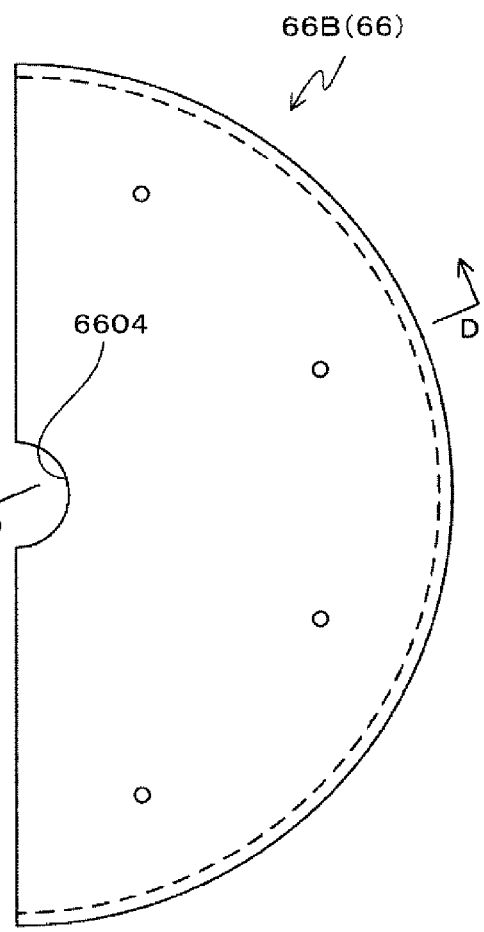
FIG. 12B
FIG. 12D
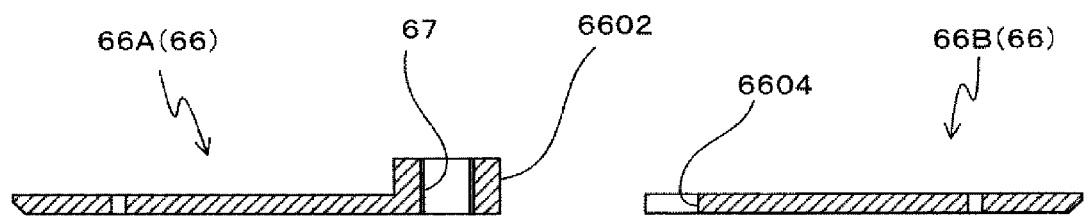

DEVICE FOR ATTACHING MOUTHPIECE TO INNERLINER OF AIRCRAFT WATER TANK

TECHNICAL FIELD

The present technology relates to a device for attaching a mouthpiece to an innerliner of an aircraft water tank.

BACKGROUND ART

Known aircraft water tanks include a tank body including an innerliner and a fiber-reinforced resin layer that covers the innerliner. The tank body includes a cylindrical portion and a dome portion on either side of the cylindrical portion.

In an aircraft water tank, an opening portion is centrally provided on the dome portions on both sides for cleaning the inside of the tank body. The opening portion includes a mouthpiece centrally attached to the dome portion and a lid removably joined to the mouthpiece via an O-ring.

The mouthpiece includes a cylinder-like portion with a female thread to which a male thread of the lid engages and a skirt portion that extends outward in the radial direction of the cylinder-like portion from the end portion of the cylinder-like portion. The innerliner is attached to the inner circumferential surface of the skirt portion by an adhesive, and the fiber-reinforced resin layer is attached to the outer circumferential surface of the skirt portion (see Japan Unexamined Patent Publication No. 2011-251736).

The end portion of the innerliner is located closer to the inside of the tank body than the O-ring on the inner circumferential surface of the skirt portion, and when the aircraft water tank is in use, drinking water directly comes into contact with the inner circumferential surface of the skirt portion including the end portion of the innerliner.

Thus, in a known aircraft water tank, to stop water from directly coming into contact with the mouthpiece and the adhesive that attaches the innerliner to the skirt portion when in use, the surface of the skirt portion around the end portion of the innerliner requires a coating process of applying a Food and Drug Administration (FDA) approved material.

This adds a coating step to the manufacturing process of the aircraft water tank, and at the time of maintenance, the coating must be inspected and repaired. Accordingly, there is a demand for enhancement to increase manufacturing efficiency, to reduce costs, and to increase the efficiency of maintenance operations.

The present applicant has proposed an aircraft water tank in which the end portion of the innerliner is disposed farther to the outside of the tank body than the O-ring so that the end portion of the innerliner does not come into contact with the drinking water when the aircraft water tank is in use (see International Patent Publication No. WO 2016/194574).

In this technology, a cylinder-like portion to which a lid is joined is provided on a mouthpiece, a skirt portion that extends radially outward is provided on an end portion of the cylinder-like portion in an axial direction, a first annular surface facing the direction opposite that of the skirt portion is formed on the cylinder-like portion, and a second annular surface facing the direction opposite that of the first annular surface is formed on the skirt portion.

The innerliner is formed by blow molding to form a cylindrical portion, a dome portion, and a cylindrical cylinder portion that continues radially inward of the dome portion.

The cylinder portion of the innerliner is inserted in the cylinder-like portion of the mouthpiece, the cylinder portion of the innerliner is abutted against the first annular surface of the mouthpiece and attached thereto via thermal deformation using a mold, and an inner circumferential portion of the dome portion of the innerliner is abutted against the second annular surface and attached thereto by an adhesive.

In this case, when the cylinder portion of the innerliner is inserted in the cylinder-like portion of the mouthpiece and when the upper mold and the lower mold are brought together, if there is a gap between the upper mold and the lower mold, a portion of the innerliner thermally deformed by the upper mold enters this gap and forms a burr, causing a defect in the aircraft water tank.

On the other hand, when the cylinder portion of the innerliner is inserted in the cylinder-like portion of the mouthpiece and when the upper mold and the lower mold are brought together, to remove the gap between the upper mold and the lower mold, due to the structure of the upper mold and the lower mold, the upper mold or the lower mold interferes with the cylinder portion of the innerliner when bringing the upper mold and the lower mold together. Thus, attaching the mouthpiece to the innerliner cannot be done smoothly, and the aircraft water tank cannot be efficiently manufactured.

SUMMARY

The present technology provides a device for attaching a mouthpiece to an innerliner of an aircraft water tank that can be efficiently manufactured, wherein the upper mold and the lower mold can be brought together smoothly without a gap therebetween, and the mouthpiece can be attached to the innerliner without producing burrs.

An embodiment of the present technology is a device for attaching a mouthpiece to an innerliner of an aircraft water tank, wherein a cylinder portion centrally located on a dome portion of an innerliner is located on an inner side of a cylinder-like mouthpiece, the cylinder portion is thermally deformed in a state of being abutted against a first annular surface that annularly expands centered on an axial center of the mouthpiece, and a section of the dome portion near the cylinder portion is abutted against a second annular surface and attached thereto via an adhesive, the second annular surface annularly expanding centered on the axial center of the mouthpiece and facing a direction opposite to that of the first annular surface, the mouthpiece comprising an inner circumferential surface connecting an inner circumferential end of the first annular surface and an inner circumferential end of the second annular surface, the device comprising:

an upper mold; and a lower mold disposed below the upper mold and coaxially with the upper mold; wherein the upper mold comprises an upper mold body and a heating portion;

the upper mold body comprises an outer abutting surface that abuts the cylinder portion against the first annular surface and is heated by the heating portion and an upper mold side positioning outer circumferential surface connected to a lower end of the outer abutting surface;

the lower mold comprises an inner abutting surface that abuts the section of the dome portion near the cylinder portion against the second annular surface and an outer circumferential portion comprising a lower mold side positioning inner circumferential surface capable of engaging with the upper mold side positioning outer circumferential surface;

the outer abutting surface, with the cylinder portion abutted against the first annular surface, extends to a section inward in a radial direction of a portion of the innerliner where an inner circumferential end of the first annular surface abuts; and a projection portion is formed as a projection on an inner circumferential end of the inner abutting surface that, with the cylinder portion of the innerliner located inside the mouthpiece and with the upper mold and the lower mold being brought together, closes a gap between an inner circumferential end of the outer abutting surface or a section of the upper mold side positioning outer circumferential surface following on from the inner circumferential end of the outer abutting surface and a portion of the innerliner where the inner circumferential surface abuts.

According to an embodiment of the present technology, the projection portion is provided such that the portion of the innerliner that is thermally deformed is prevented from being displaced radially inward of the mouthpiece along the first annular surface.

Accordingly, in a state in which the innerliner and the mouthpiece are attached together, sharp burrs pointing inward in the radial direction of the bulging portion of the mouthpiece can be prevented from forming. This is advantageous in that the aircraft water tank can be efficiently manufactured without defects.

Furthermore, the upper mold side positioning outer circumferential surface connected to the inner circumferential end of the outer abutting surface is located inward in the radial direction of the cylinder portion of the innerliner. Thus, inserting the upper mold inside the cylinder portion of the upper mold can be performed smoothly without interference from the upper end of the cylinder portion. This is advantageous in that the aircraft water tank can be efficiently manufactured without defects.

BRIEF DESCRIPTION OF DRAWINGS

FIG. 12A is a plan view of one of the plate sections that constitutes the lower mold according to an embodiment. FIG. 12B is a cross-sectional view along line B-B of FIG. 12A. FIG. 12C is a plan view of the other plate section that constitutes the lower mold. FIG. 12D is a cross-sectional view along line D-D of FIG. 12C.

FIG. 13A illustrates a state in which the holding member is located on one of the plate sections and the two plate sections are in a foldable state. FIG. 13B illustrates a state in which the holding member is located spanning across the two plate sections and an open state is being held.

DETAILED DESCRIPTION

Next, embodiments of the present technology will be described with reference to the drawings.

Firstly, an aircraft water tank 10 will be described with reference to FIG. 1.

The aircraft water tank 10 is installed in an aircraft and contains drinking water. The aircraft water tank 10 includes a tank body 12, the inside of which corresponds to a water containment space.

The tank body 12 includes a cylindrical portion 14 and dome portions 16 provided on both sides of the cylindrical portion 14.

Figure 2:
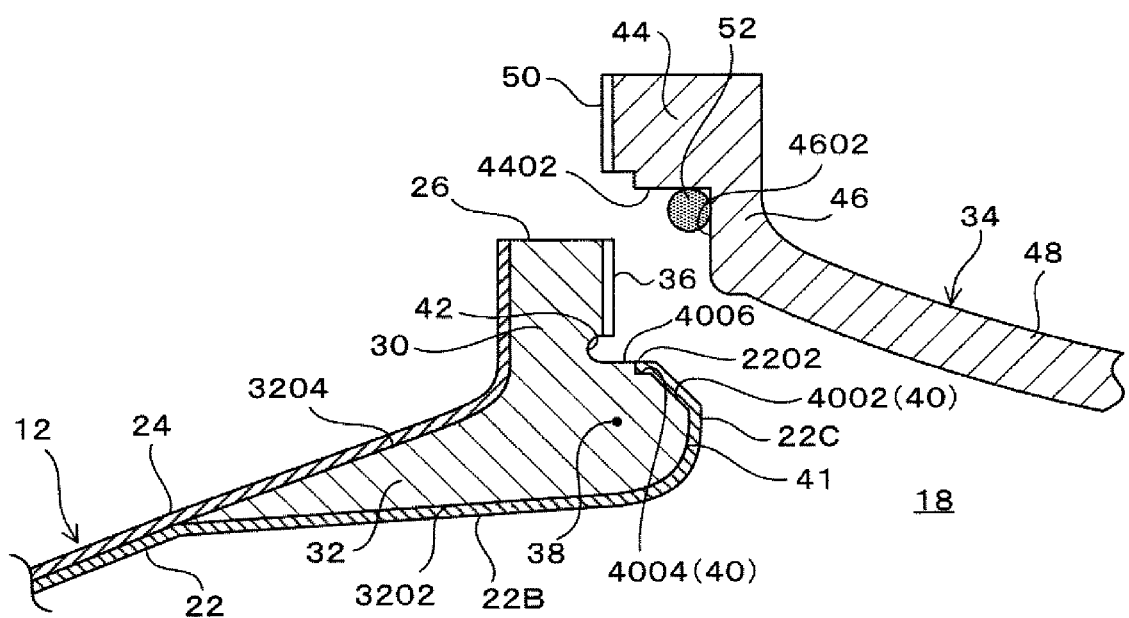
FIG. 2 is an enlarged view of a main portion of a mouthpiece and a lid with the mouthpiece and the lid separated.

As illustrated in FIG. 2, opening portions 18 for cleaning the inside of the tank body 12 are centrally provided on both dome portions 16, and each of the opening portions 18 is opened and closed by a lid 34.

Furthermore, a nozzle portion for piping (not illustrated) for supplying water to each location of an aircraft is provided on an upper portion of the cylindrical portion 14, and a nozzle portion for piping (not illustrated) for discharging water is provided on a lower portion of the cylindrical portion 14.

Figure 1:
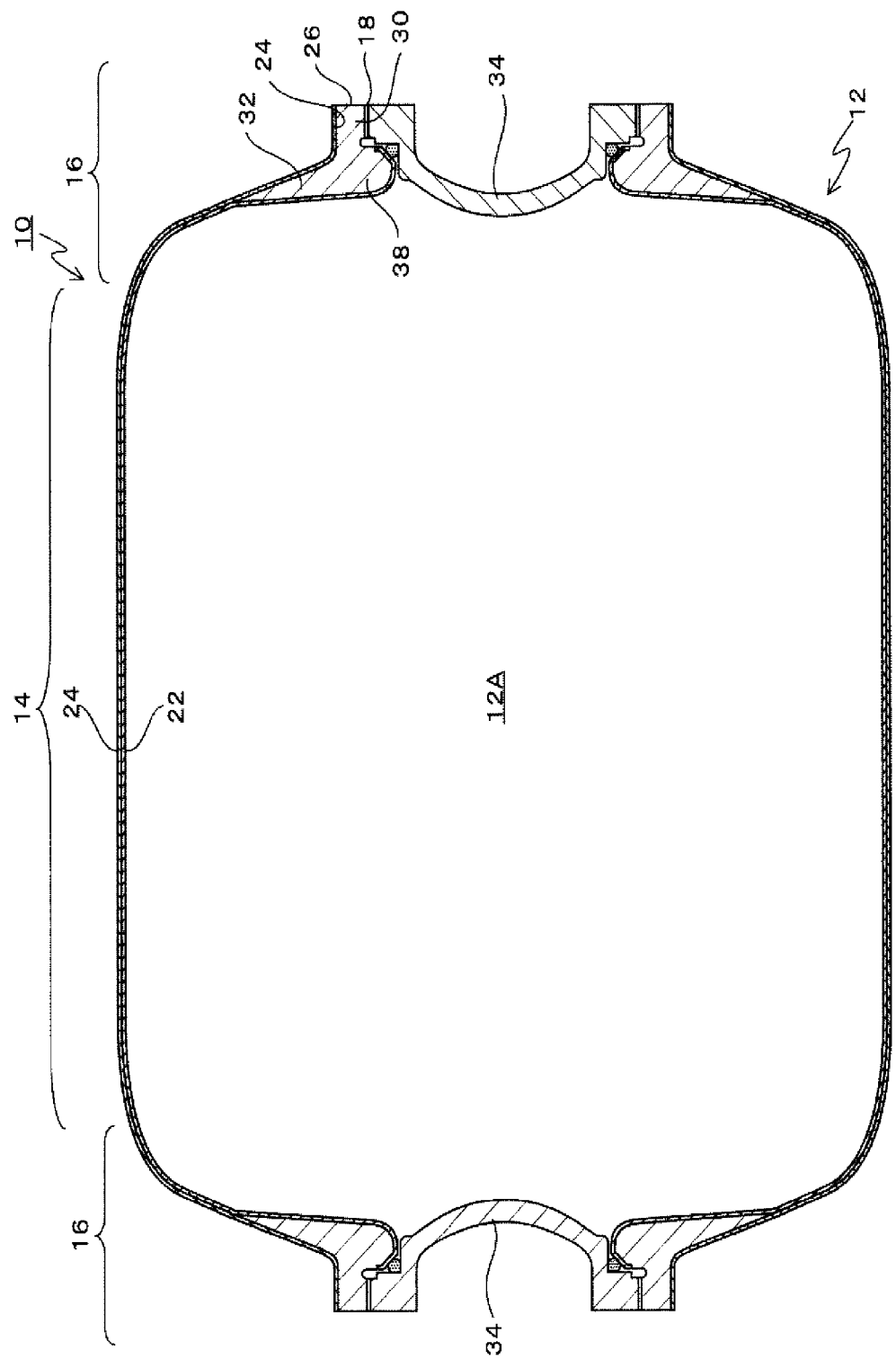
FIG. 1 is a cross-sectional view of an aircraft water tank.

As illustrated in FIG. 1, the tank body 12 includes an innerliner 22 forming the inner surface of the aircraft water tank 10 and a fiber-reinforced resin layer 24 covering the outer surface of the innerliner 22.

The innerliner 22 is a hollow body defining the contour of the aircraft water tank 10 and is formed by blow molding. The blow molding involves melting a synthetic resin into a pipe-like shape, inserting the pipe into a mold, and pumping air into the interior of the pipe to obtain a molded product.

Figure 4:
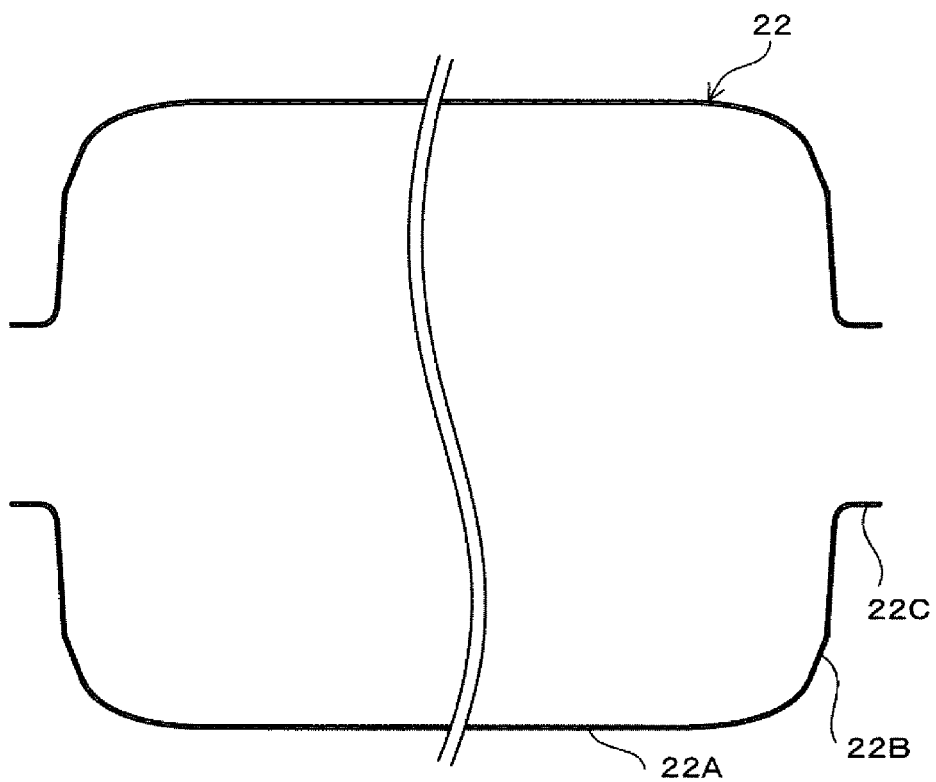
FIG. 4 is a cross-sectional view of an innerliner obtained by blow molding.

As illustrated in FIG. 4, the innerliner 22 obtained by blow molding includes a cylindrical portion 22A, a dome portion 22B provided on either side of the cylindrical portion 22A, and a cylinder portion 22C disposed projecting from the center of the dome portion 22B.

For the innerliner 22, various known FDA approved materials can be used. Examples of such materials include polyolefin resins such as polypropylene and polyethylene which are thermoplastic resins.

The fiber-reinforced resin layer 24 is formed via a filament winding method in which reinforcing fibers (filaments) impregnated with a thermosetting resin are wound around the outer circumferential surface of the innerliner 22.

Various known synthetic resins such as epoxy resin can be used as the thermosetting resin. Various known fibers such as carbon fibers or glass fibers can be used as the reinforcing fibers.

Figure 3:
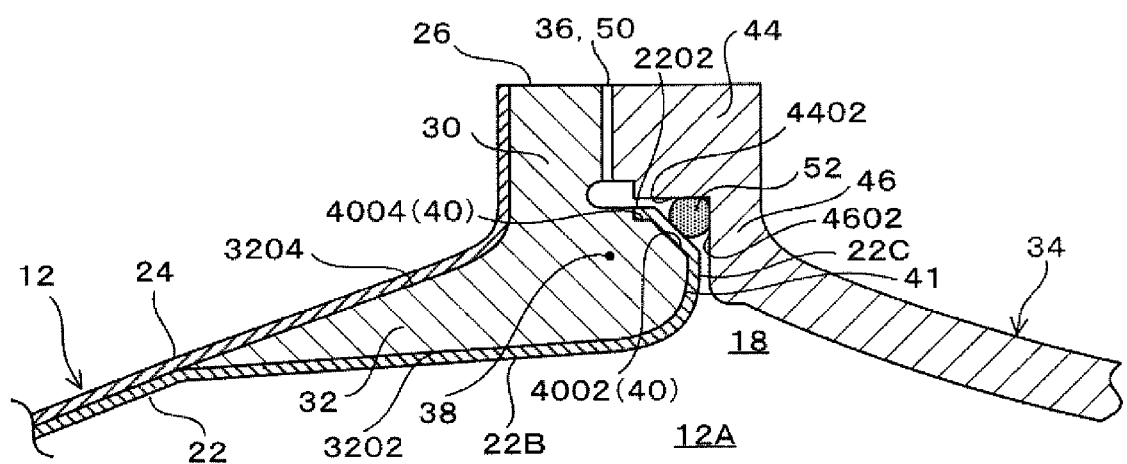
FIG. 3 is an enlarged view of a main portion of a mouthpiece and a lid with the mouthpiece and the lid joined.

Each of the opening portions 18 is formed by an annular mouthpiece 26 attached between an end of the innerliner 22 and an end of the fiber-reinforced resin layer 24. As illustrated in FIG. 3, when the aircraft water tank 10 is in use, the opening portion 18 is sealed by the lid 34.

Figure 5:
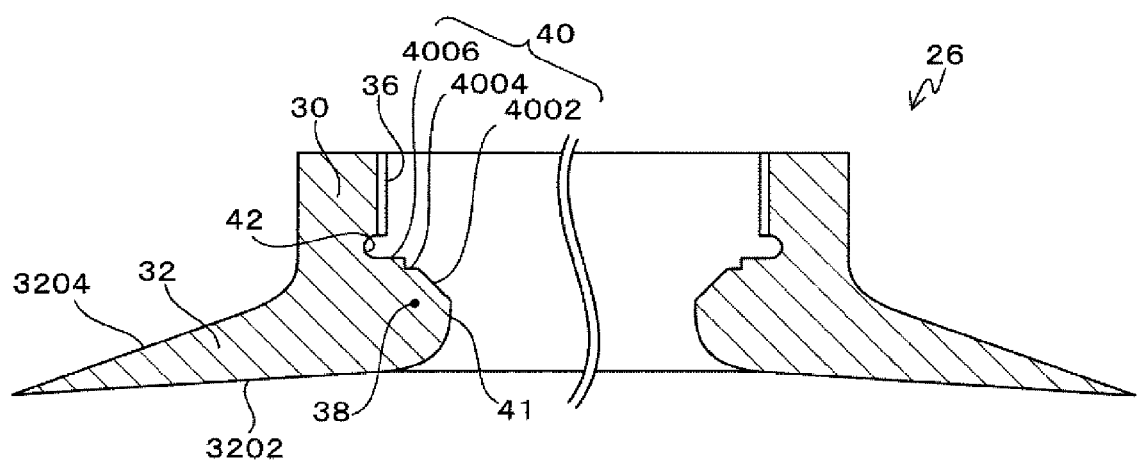
FIG. 5 is a cross-sectional view of a mouthpiece.

As illustrated in FIG. 5, the mouthpiece 26 includes a cylinder-like portion 30 centrally disposed in the dome portion 16, a skirt portion 32, and a bulging portion 38.

A female thread 36 is provided on the inner circumferential portion of a first end of the cylinder-like portion 30 in the axial direction. The female thread 36 is the mouthpiece side joining portion on the mouthpiece side to which the lid 34 joins to.

The skirt portion 32 extends outward in the radial direction of the cylinder-like portion 30 from the entire circumference of the outer circumferential portion of a second end of the cylinder-like portion 30 in the axial direction.

The bulging portion 38 bulges inward in the radial direction from the entire circumference of the inner circumferential portion of the second end of the cylinder-like portion 30 in the axial direction. The bulging portion 38 bulges inward in the radial direction further than the inner diameter of the female thread 36.

The bulging portion 38 includes an outer bulging surface 40 that faces the first end side of the cylinder-like portion 30 in the axial direction and includes an inner circumferential surface 41 that continues on from the inner circumferential end of the outer bulging surface 40. The inner circumferential surface 41 is formed as a curved surface.

The outer bulging surface 40 includes an inclined surface 4002, an annular surface 4004, and a flat surface 4006.

The inclined surface 4002 is formed with a conical surface with an inner diameter gradually increasing toward the first end side in the axial direction of the cylinder-like portion 30, and the second end of the inclined surface 4002 in the axial direction is connected to the inner circumferential surface 41.

The annular surface 4004 is connected to a first end of the inclined surface 4002 in the axial direction and is formed in an annular shape with a flat surface orthogonal to the axial direction with an outer diameter greater than the inner diameter of the first end of the inclined surface 4002.

The flat surface 4006 is formed with an annular flat surface orthogonal to the axial direction located outward in the radial direction of the annular surface 4004 at a position of the bulging portion 38 separated from the annular surface 4004 to the first end side in the axial direction by a distance corresponding to the thickness of the innerliner 22.

In addition, a groove 42 that includes an inner circumferential surface with dimensions greater than the major diameter of the female thread 36 is formed at a position of the inner circumferential portion of the cylinder-like portion 30, the position where the female thread 36 and the bulging portion 38 meet.

Of the pair of opposing side surfaces of the groove 42, the side surface on the bulging portion 38 side is flush with the flat surface 4006.

The skirt portion 32 is formed so that the outer diameter increases gradually in the direction away from the bulging portion 38 and the wall thickness decreases.

The skirt portion 32 includes an inner skirt surface 3202 facing the direction opposite to that of the first end of the cylinder-like portion 30 in the axial direction and an outer skirt surface 3204 facing the first end side of the cylinder-like portion 30 in the axial direction.

Figure 10:
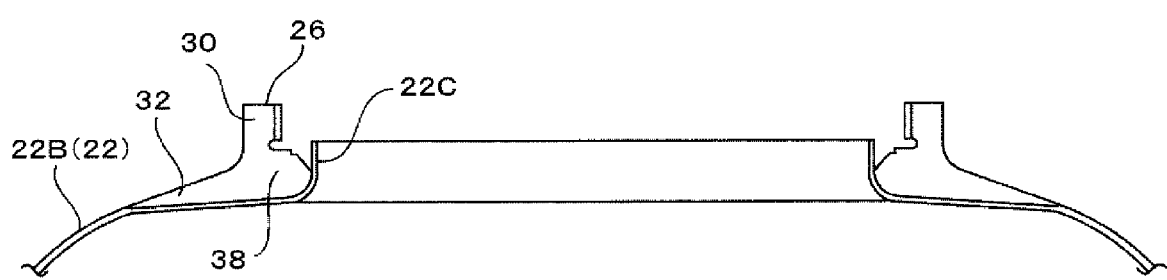
FIG. 10 is an explanatory diagram illustrating a state in which the mouthpiece is placed on the surface of the dome portion near the cylinder portion of the innerliner according to an embodiment.

The inner circumferential end of the inner skirt surface 3202 is connected to the inner circumferential surface 41, and, as illustrated in FIG. 10, the inner circumferential surface 41 and the inner skirt surface 3202 have a shape that conforms to the central portion of the dome portion 22B of the innerliner 22 and the base portion of the cylinder portion 22C and are designed so that the innerliner 22 described below can be smoothly attached from the inner skirt surface 3202 to the surface of the bulging portion 38.

As illustrated in FIG. 2, the fiber-reinforced resin layer 24 is attached from the cylindrical portion 22A of the innerliner 22 and the dome portion 22B to the outer skirt surface 3204 of the mouthpiece 26 and the outer circumferential surface of the cylinder-like portion 30.

The innerliner 22 is thermally deformed with a section of the dome portion 22B near the cylinder portion 22C abutted against the inner skirt surface 3202 and attached by an adhesive and with the cylinder portion 22C abutted against the outer bulging surface 40.

In the present embodiment, the outer bulging surface 40 corresponds to a first annular surface (hereinafter also referred to as "first annular surface 40") in the claims, and the inner skirt surface 3202 corresponds to a second annular surface (hereinafter also referred to as "second annular surface 3202") in the claims.

Additionally, the inner circumferential surface 41 of the mouthpiece 26 connects together the inner circumferential end of the first annular surface 40 and the inner circumferential end of the second annular surface 3202.

An end portion 2202 of the thermally deformed innerliner 22 is located on the annular surface 4004 further inward in the radial direction than the inner diameter of the female thread 36. Accordingly, when the cylinder portion 22C is thermally deformed on the outer bulging surface 40, whether the innerliner 22 is securely abutted against the outer bulging surface 40 and attached thereto can be easily visually confirmed from the inner side of the female thread 36. This configuration allows manufacturing efficiency to be improved.

The lid 34 includes a ring plate portion 44, a cylinder portion 46 disposed projecting from the inner circumferential portion of one end surface of the ring plate portion 44 in the thickness direction, and an end surface portion 48 that connects the end of the cylinder portion 46.

A male thread 50 is formed on the outer circumferential portion of the ring plate portion 44. The male thread 50 is the lid side joining portion to which the mouthpiece side joining portion joins and can engage with the female thread 36.

Furthermore, in the present embodiment, an O-ring 52 is installed as a sealing member at a section on the outer circumferential surface of the cylinder portion 46 near the end surface. By installing the O-ring 52 on the lid 34, the opening and closing operation of the opening portion 18 via the lid 34 can be simplified.

Note that in the present embodiment, the mouthpiece 26 and the lid 34 are formed of the same synthetic resin material as the FDA approved material, and the male thread 50 and the female thread 36 can smoothly be joined together.

As illustrated in FIG. 3, with the lid 34 joined to the opening portion 18 via engagement of the male thread 50 with the female thread 36, the O-ring 52 is compressed between the portion of the lid 34 projecting toward the inside of the tank body 12 from the female thread 36 and the portion of the innerliner 22 located at the inclined surface 4002. This allows the opening portion 18 to be sealed in a liquid-tight manner and for a sealed water containment space 12A to be formed inside the tank body 12.

In the present embodiment, the portion of the lid 34 that compresses the O-ring 52 is a corner portion formed by an end surface 4402 of the ring plate portion 44 and an outer circumferential surface 4602 of the cylinder portion 46. The portion of the innerliner 22 that compresses the O-ring 52 is the portion located at the inclined surface 4002.

The end portion 2202 of the innerliner 22 attached to the surface of the bulging portion 38 is located at a section on the surface of the bulging portion 38 further away from the water containment space 12A than where the O-ring 52 is compressed.

According to such an aircraft water tank 10, with the opening portion 18 sealed by the lid 34, the inner skirt surface 3202 of the skirt portion 32 of the mouthpiece 26 and the surface of the bulging portion 38 located in the drinking water are covered by the innerliner 22, and the end portion 2202 of the innerliner 22 is located on the surface of the bulging portion 38 further away from the water containment space 12A than the O-ring 52 that seals the inside of the tank body 12 in a liquid-tight manner. In other words, the end portion 2202 of the innerliner 22 is positioned outside the water containment space 12A.

Thus, when the aircraft water tank 10 is in use, water contained inside the tank body 12 does not come into contact with the end portion 2202 of the innerliner 22.

As a result, the coating operation to prevent water leakage using an FDA approved material on the surface (inner skirt surface 3202) of the skirt portion 32 around the end portion 2202 of the innerliner 22 can be omitted. This has the advantage of increasing the manufacturing efficiency of the aircraft water tank 10 and reducing costs. Furthermore, at the time of maintenance, the operation of inspecting and repairing the coating for preventing water leakage using an FDA approved material can be omitted. This has the advantage of increasing the efficiency of maintenance work.

Furthermore, when the aircraft water tank 10 is in use, the inner skirt surface 3202 and the surface of the bulging portion 38 of the mouthpiece 26 located in the drinking water are covered by the innerliner 22. Thus, the mouthpiece 26 and the drinking water do not come into direct contact with one another.

Accordingly, in manufacturing the mouthpiece 26, the material used is not restricted to an FDA approved material and desired materials with various properties can be used. This has the advantage of increasing the degree of freedom in design.

Next, an attaching device for attaching the innerliner 22 and the mouthpiece 26 of such an aircraft water tank together will be described.

As illustrated in FIGS. 6 to 9, an attaching device 54 includes an upper mold 56, a lower mold 58, and a biasing portion 60.

The upper mold 56 includes an upper mold body 62 and a heating portion 64.

The upper mold 56 is formed of a material with rigidity. As such a material, various known materials that include a metal can be employed. In the present embodiment, an aluminum alloy is used.

Figure 11A:
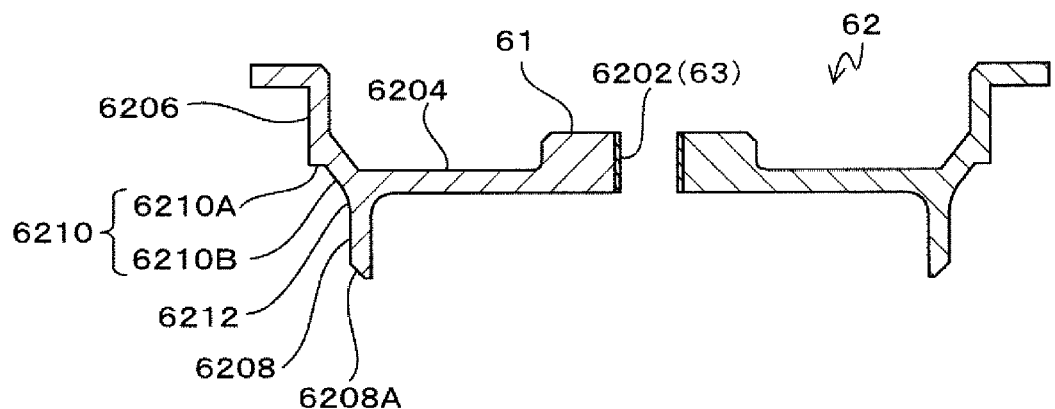
FIG. 11A is a cross-sectional view of an upper mold body according to an embodiment.
Figure 11B:
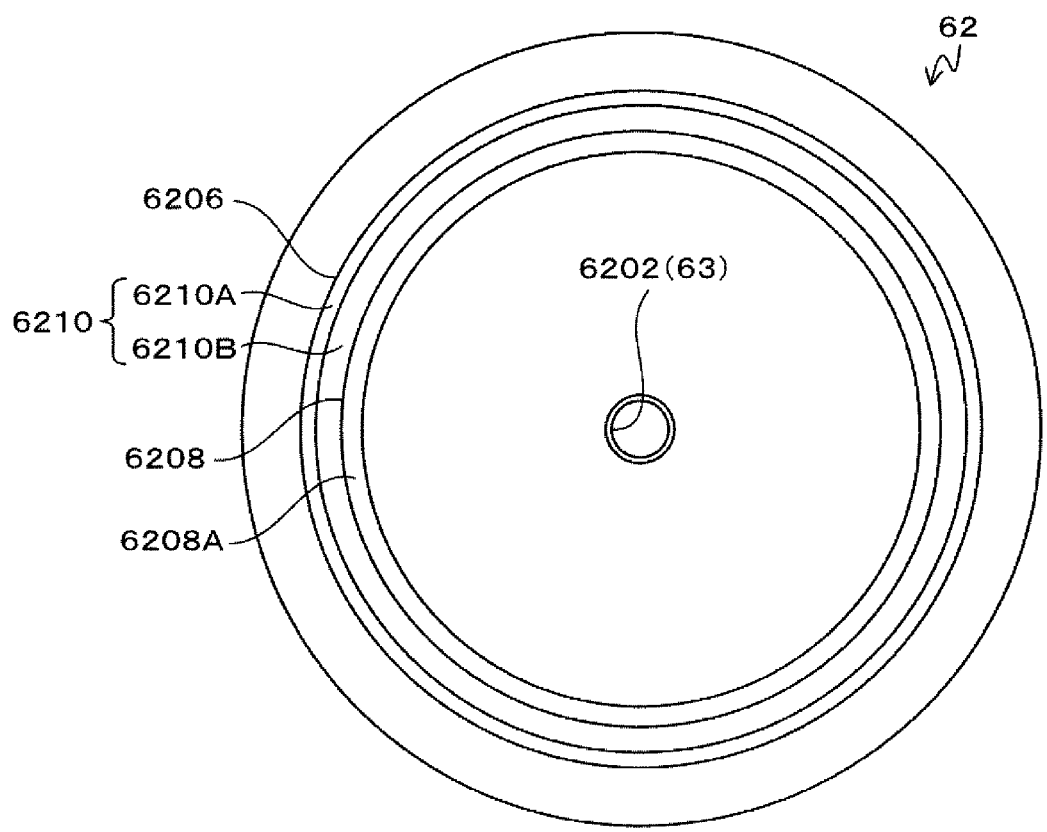
FIG. 11B is a bottom view of FIG. 11A.

As illustrated in FIGS. 11A and 11B, the upper mold body 62 has a substantially disk-like shape. A shaft insertion hole 6202, a heating portion containing recess portion 6204, an upper cylindrical surface portion 6206, an upper mold side positioning outer circumferential surface 6208, and an outer abutting surface 6210 are provided on the upper mold body 62. The shaft insertion hole 6202, the upper cylindrical surface portion 6206, the upper mold side positioning outer circumferential surface 6208, and the outer abutting surface 6210 are coaxially located.

The shaft insertion hole 6202 is formed in the inner circumferential surface of a bearing 63 fitted to a boss portion 61 of a central portion of the upper mold body 62. The axial center of the upper mold body 62 and the axial center of the bearing 63 are aligned with one another. The shaft insertion hole 6202, together with a shaft member 70 described below, functions to position the upper mold 56 and the lower mold 58 in a coaxial manner, and the bearing 63 rotatably supports the shaft member 70.

The heating portion containing recess portion 6204 is provided on the upper surface of the upper mold body 62 and extends in the circumferential direction. The heating portion 64 is contained by the heating portion containing recess portion 6204 and heats the outer abutting surface 6210. Various known heating members such as electric heaters can be used as the heating portion 64.

The upper cylindrical surface portion 6206 is formed on the upper portion of the upper mold body 62 with an outer circumferential surface with an outer diameter less than the inner diameter of the female thread 36.

The upper mold side positioning outer circumferential surface 6208 is formed on the lower portion of the upper mold body 62 with an outer circumferential surface with an outer diameter less than the upper cylindrical surface portion 6206, or in other words, formed with a cylindrical surface with the axial center of the upper mold body 62 as its center. The upper mold side positioning outer circumferential surface 6208 functions to position the upper mold 56 and the lower mold 58 in a coaxial manner.

An inclined surface 6208A is formed on the lower end of the upper mold side positioning outer circumferential surface 6208. The outer diameter of the inclined surface 6208A gradually decreases downwards. The inclined surface 6208A facilitates the smooth engagement of the upper mold side positioning outer circumferential surface 6208 and a lower mold side positioning inner circumferential surface 5804 to be described below.

The outer abutting surface 6210 is a section that abuts the cylinder portion 22C of the innerliner 22 against the outer bulging surface 40 of the mouthpiece 26 and connects together the lower end of the upper cylindrical surface portion 6206 and the upper end of the upper mold side positioning outer circumferential surface 6208.

The outer abutting surface 6210 includes a first abutting surface 6210A that abuts the end portion 2202 of the cylinder portion 22C against the annular surface 4004 and a second abutting surface 6210B that abuts the section of the cylinder portion 22C following on from the end portion 2202 against the inclined surface 4002.

The first abutting surface 6210A is formed with an annular flat surface with an outer diameter that is greater than that of the annular surface 4004, abuts the end portion 2202 of the cylinder portion 22C against the annular surface 4004, and to itself abuts the flat surface 4006.

The second abutting surface 6210B is formed by the inclined surface that has an outer diameter that gradually decreases from the inner circumferential end of the first abutting surface 6210A toward the upper mold side positioning outer circumferential surface 6208 and is a conical surface in the present embodiment.

Figure 9:
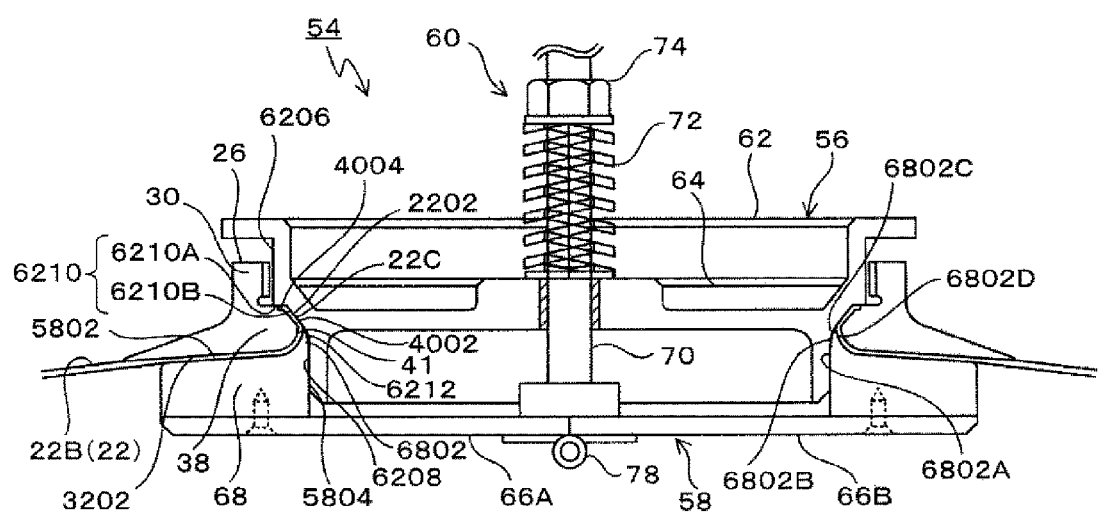
FIG. 9 is an explanatory diagram illustrating a state in which a section of the mouthpiece between an outer bulging surface and an inner skirt surface is sandwiched by the inner abutting surface of the lower mold and the outer abutting surface of the upper mold being biased by the elastic force of the coil spring according to an embodiment.

As illustrated in FIG. 9, the second abutting surface 6210B constituting the outer abutting surface 6210, when the cylinder portion 22C of the innerliner 22 is abutted against the inclined surface 4002 constituting the first annular surface 40, extends to a section displaced inward in the radial direction of the portion of the innerliner 22 abutted by the inner circumferential end of the inclined surface 4002.

As illustrated in FIG. 11, in the present embodiment, the inner circumferential end (lower end) of the second abutting surface 6210B that constitutes the outer abutting surface 6210 is connected to the upper end of the upper mold side positioning outer circumferential surface 6208 via a curved surface 6212.

As illustrated in FIGS. 6 to 9, the lower mold 58 is coaxially disposed with the upper mold 56 under the upper mold 56.

The lower mold 58 includes an inner abutting surface 5802, the lower mold side positioning inner circumferential surface 5804, and a projection portion 6802. The inner abutting surface 5802, the lower mold side positioning inner circumferential surface 5804, and the projection portion 6802 are coaxially disposed with the lower mold 58. In other words, the inner abutting surface 5802, the lower mold side positioning inner circumferential surface 5804, and the projection portion 6802 are annularly formed as center shafts around the axial center of the lower mold 58.

The inner abutting surface 5802 is the section that abuts the section of the dome portion 22B near the cylinder portion 22C against the second annular surface 3202 to attach the two via an adhesive.

The lower mold side positioning inner circumferential surface 5804 is formed with a cylindrical surface with the axial center of the lower mold 58 as a center axis and is capable of engaging with the upper mold side positioning outer circumferential surface 6208.

By the lower mold side positioning cylindrical surface 5804 and the upper mold side positioning cylindrical surface 6208 engaging, the upper mold 56 and the lower mold 58 are coaxially positioned.

The projection portion 6802, when the cylinder portion 22C of the innerliner 22 is positioned inside the mouthpiece 26 and when the upper mold 56 and the lower mold 58 are brought together, is a section that closes the gap between the inner circumferential end of the outer abutting surface 6210 or a section of the upper mold side positioning outer circumferential surface 6208 including the curved surface 6212 following on from the inner circumferential end and a portion of the innerliner 22 where the inner circumferential surface 41 abuts. The projection portion 6802 is formed projecting toward the inner circumferential end of the inner abutting surface 5802.

As illustrated in FIG. 9, the inner surface of the projection portion 6802 in the radial direction includes a cylindrical surface 6802A capable of engaging with the upper mold side positioning outer circumferential surface 6208, a curved surface 6802B capable of engaging with the curved surface 6212, and a conical surface 6802C capable of engaging with the inner circumferential end of the outer abutting surface 6210. Thus, the inner surface of the projection portion 6802 in the radial direction is provided continuously with the lower mold side positioning inner circumferential surface 5804.

Additionally, the outer surface of the projection portion 6802 in the radial direction includes a curved surface 6802D capable of engaging with the portion of the innerliner 22 joined with the inner circumferential surface 41 of the mouthpiece 26.

By the shaft member 70 being inserted into the shaft insertion hole 6202, the upper mold 56 and the lower mold 58 are coaxially positioned, and by the lower mold side positioning inner circumferential surface 5804 and the upper mold side positioning outer circumferential surface 6208 engaging, the upper mold 56 and the lower mold 58 are coaxially positioned. In the present embodiment, by the shaft member 70 being inserted into the shaft insertion hole 6202, the upper mold 56 and the lower mold 58 are coaxially positioned, and by the lower mold side positioning inner circumferential surface 5804 and the upper mold side positioning outer circumferential surface 6208 engaging, the upper mold 56 and the lower mold 58 are coaxially positioned in a supplementary manner.

The section of the lower mold 58 that includes the lower mold side positioning inner circumferential surface 5804 is formed of a material with a lower thermal conductivity than that of the upper mold 56.

In the present embodiment, the lower mold 58 includes a plate portion 66 and an outer circumferential member 68. In the present embodiment, the outer circumferential member 68 corresponds to the outer circumferential portion in the claims.

The plate portion 66 is formed of a disk-like member with a uniform thickness that has an outer diameter that corresponds to the outer diameter of the second annular surface 3202.

The plate portion 66 is formed of a material with rigidity. As such a material, various known materials that include a metal can be employed. In the present embodiment, an aluminum alloy is used.

The outer circumferential member 68 is detachably attached to the outer circumferential portion of the plate portion 66 by a screw N.

The outer circumferential member 68 is formed of a material with a lower thermal conductivity than that of the upper mold 56, with rigidity, and with a higher heat resistance than that of the innerliner 22.

Various known materials such as fluororesins can be employed as such a material with rigidity, with heat resistance, and with a low thermal conductivity.

The outer circumferential member 68 has a ring plate shape, and the inner circumferential surface is formed as the lower mold side positioning inner circumferential surface 5804, which is capable of engaging with the upper mold side positioning outer circumferential surface 6208.

The upper surface of the outer circumferential member 68 is formed as the inner abutting surface 5802, and the projection portion 6802 is formed as a projection on the inner circumferential end of the inner abutting surface 5802.

The shaft member 70 is disposed projecting from the center of the plate portion 66 in the axial direction of the lower mold 58.

The shaft member 70 is inserted into a bearing 67 fit to the center of the plate portion 66.

When the innerliner 22 and the mouthpiece 26 are attached to one another, the shaft member 70 is inserted into the shaft insertion hole 6202 of the upper mold 56.

The biasing portion 60 includes a coil spring 72 installed around the shaft member 70 that biases the upper mold body 62 toward the lower mold 58.

That is, one end of the coil spring 72 abuts the upper surface of the inner circumferential portion of the upper mold body 62, and the other end of the coil spring 72 abuts a nut 74 fit to the shaft member 70.

By rotating the nut 74, the compression length of the coil spring 72 is adjusted, and the force of pressing the upper mold body 62 against the lower mold 58 is adjusted.

In the present embodiment, the cylindrical portion 22A of the innerliner 22 is a single member. Thus, one end portion of the mouthpiece 26 in the axial direction is a closed space.

As such, as illustrated in FIGS. 12 to 15, the lower mold 58 includes two sections. The two sections are inserted inside the innerliner 22 from the inner side of the mouthpiece 26 in a folded state. Then, the two sections are opened inside the innerliner 22.

In other words, as illustrated in FIGS. 12A to 12D and FIGS. 13A and 13B, the plate portion 66 includes two plate sections 66A, 66B coupled together and swingable via a hinge 78 between an open state in which the plate sections 66A, 66B open flat and a folded state in which the plate sections 66A, 66B are folded in a direction toward one another.

The plate section 66A of the two plate sections 66A, 66B is provided with a thick cylindrical boss portion 6602 located in the center of the plate portion 66. The bearing 67 fits in the hole of the cylindrical boss portion 6602.

Additionally, the plate section 66B of the two plate sections 66A, 66B is provided with a semicircular arc-shaped missing portion 6604 that is capable of engaging with the cylindrical boss portion 6602.

Figure 13A:
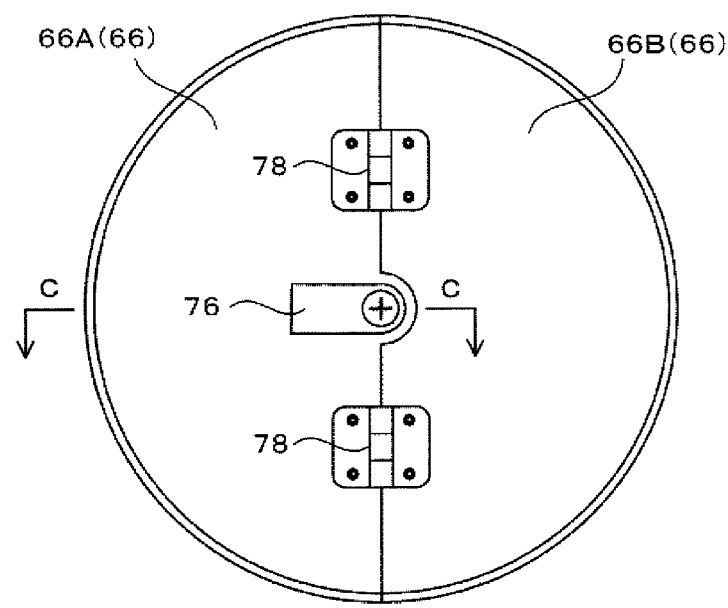
FIGS. 13A and 13B are explanatory diagrams of a holding member and the two plate sections as viewed from below.
Figure 13B:
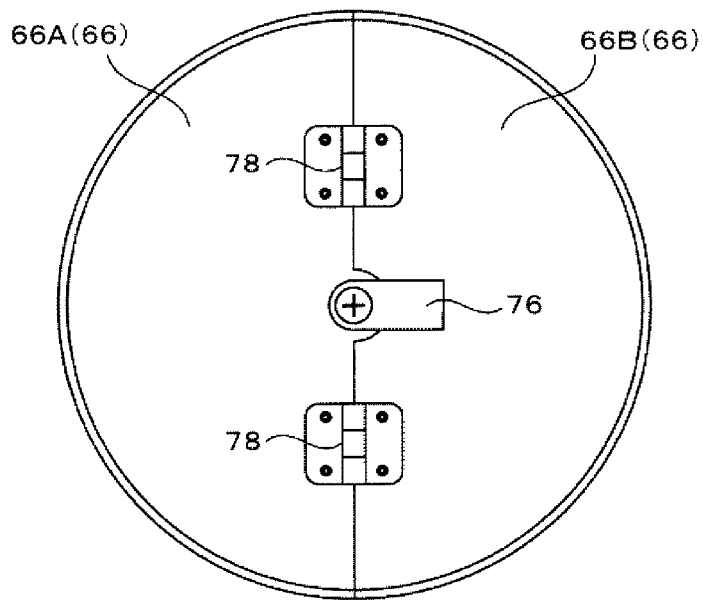
Figure 13C:
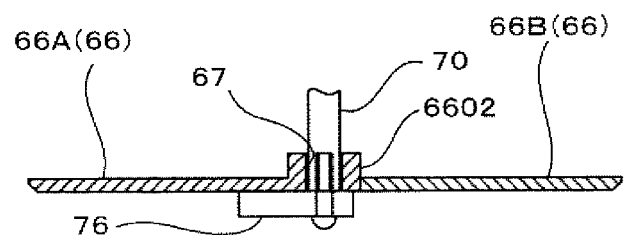
FIG. 13C is a cross-sectional view along line C-C of FIG. 13A.
Figure 14A:
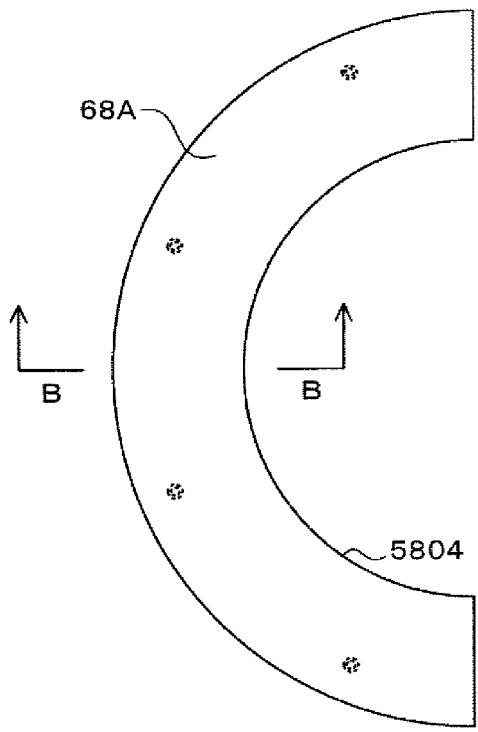
FIG. 14A is a plan view of one of the outer circumferential members according to an embodiment.
Figure 14B:
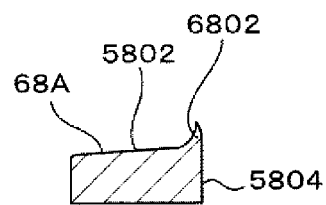
FIG. 14B is a cross-sectional view along line B-B of FIG. 14A.
Figure 14C:
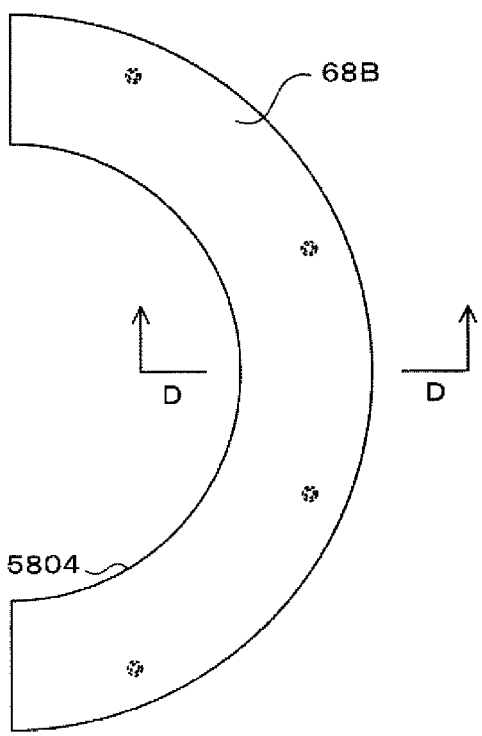
FIG. 14C is a plan view of the other outer circumferential member.
Figure 14D:
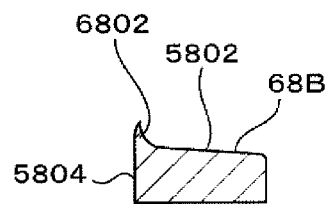
FIG. 14D is a cross-sectional view along line D-D of FIG. 14C.

As illustrated in FIG. 13C, the shaft member 70 is rotatably joined to the bearing 67 of the plate section 66A of the two plate sections 66A, 66B and disposed projecting from the plate section 66A toward the shaft insertion hole 6202.

A holding member 76 is attached at a section of the plate section 66A located opposite the upper mold body 62 and rotates integrally with the shaft member 70 at the end portion of the shaft member 70.

As illustrated in FIGS. 13A and 13C, when the two plate sections 66A, 66B are folded, the holding member 76 is located under the plate section 66A provided with the shaft member 70. In the open state, as illustrated in FIG. 13B, the holding member 76 extends under both the plate sections 66A, 66B and functions to maintain the open state.

In other words, in the present embodiment, the holding portion that enables the two plate sections 66A, 66B to be held in an open state is composed of the holding member 76.

As illustrated in FIGS. 14A to 14D, the outer circumferential member 68 includes outer circumferential sections 68A, 68B provided on the outer circumferential portion of the two plate sections 66A, 66B.

When the two plate sections 66A, 66B are in an open state, the inner abutting surface 5802 is formed from the upper surfaces of the outer circumferential sections 68A, 68B attached to the plate sections 66A, 66B, the lower mold side positioning inner circumferential surface 5804 is formed from the inner circumferential surfaces of the outer circumferential sections 68A, 68B, and the projection portion 6802 on the inner circumferential end of the inner abutting surface 5802 of the outer circumferential sections 68A, 68B is formed in a projecting manner.

Note that the cylindrical portion 22A of the innerliner 22 may be a single member as in the present embodiment or may be composed of a plurality of cylindrical portion sections divided in the axial direction of the cylindrical portion 22A joined together.

In a case in which the cylindrical portion 22A of the innerliner 22 is a plurality of cylindrical portion sections joined together, both ends of the mouthpiece 26 in the axial direction are open spaces. Thus, the lower mold 58 is not required to be composed of two sections as in this embodiment, and the lower mold 58 may be a single member like the upper mold 56.

In this case, the shaft insertion hole 6202, the shaft member 70, and the biasing portion 60 can be omitted, and the upper mold 56 and the lower mold 58 can each be raised/lowered by a lift unit. Also, in this case, by only the lower mold side positioning cylindrical surface 5804 and the upper mold side positioning cylindrical surface 6208 being engaged, the upper mold 56 and the lower mold 58 may be coaxially positioned.

Next, a process of attaching the innerliner 22 and the mouthpiece 26 together using the attaching device 54 will be described.

As illustrated in FIG. 4, the innerliner 22 formed by blow molding includes the cylindrical portion 22A, the dome portion 22B on either side of the cylindrical portion 22A, and the cylinder portion 22C disposed projecting from the center of the dome portion 22B.

Firstly, as illustrated in FIG. 10, an adhesive is applied to the surface of the dome portion 22B near the cylinder portion 22C, and the mouthpiece 26 is placed on the surface of the dome portion 22B near the cylinder portion 22C so that the cylinder portion 22C is inserted on the inner side of the bulging portion 38.

Next, the lower mold 58 is inserted inside the dome portion 22B from the inner side of the cylinder portion 22C.

Figure 15A:
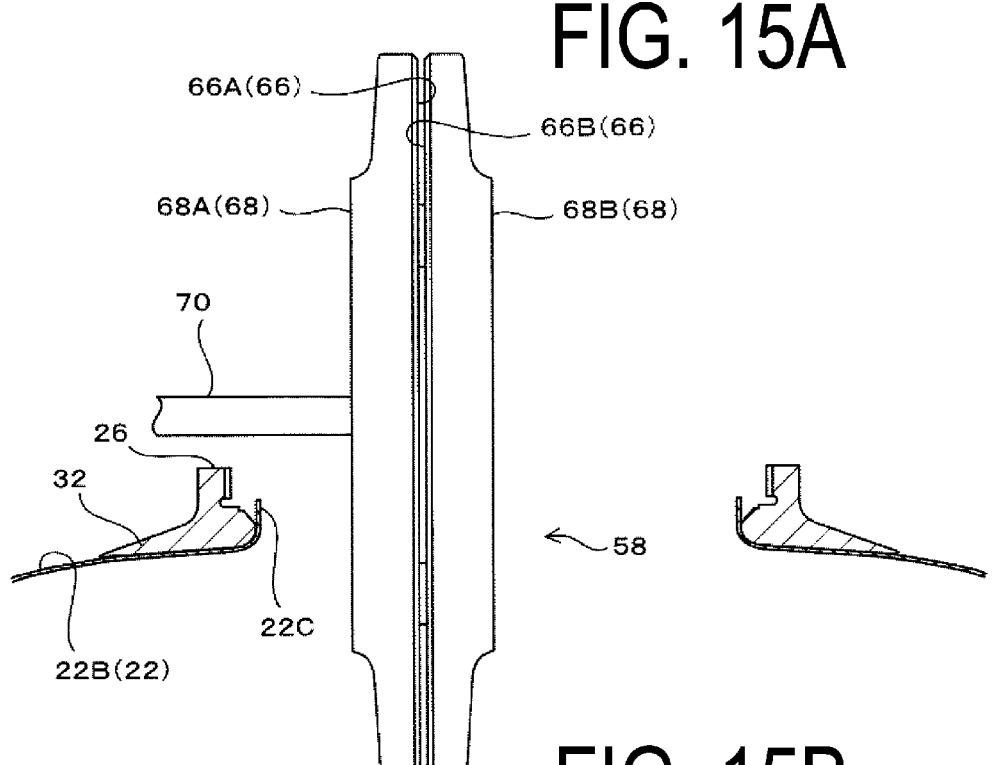
FIG. 15A is an explanatory diagram illustrating a state in which the lower mold in a folded state is inserted inside the innerliner from the inner side of the mouthpiece according to an embodiment.
Figure 15B:
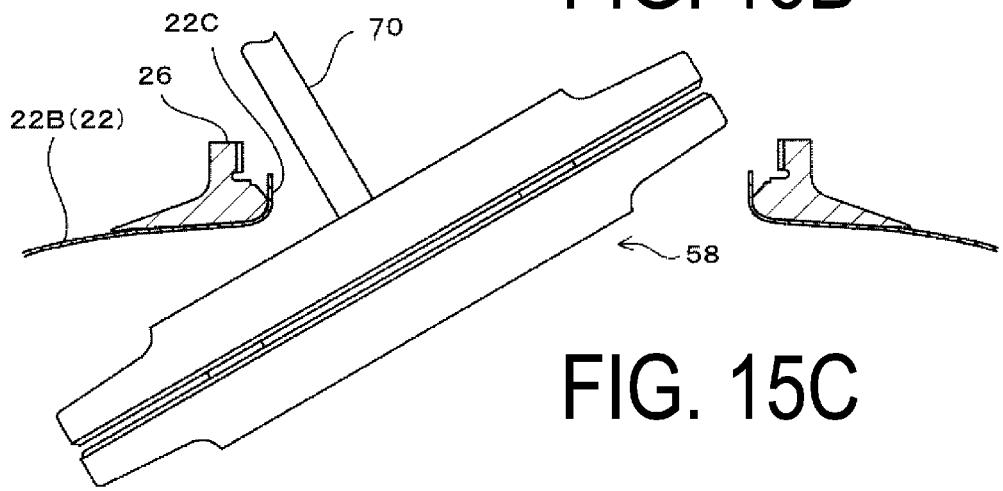
FIG. 15B is an explanatory diagram illustrating a state in which the lower mold in a folded state is further inserted inside the innerliner.
Figure 15C:
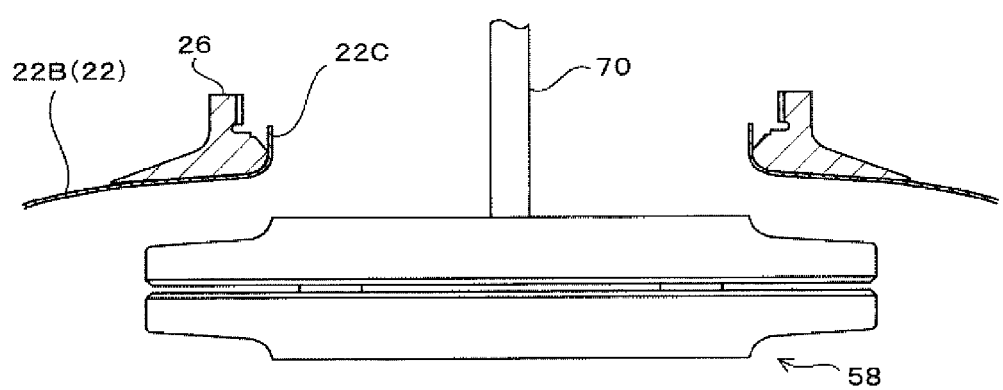
FIG. 15C is an explanatory diagram illustrating a state just prior to when the lower mold in a folded state is opened inside the innerliner.

As illustrated in FIGS. 15A, 15B, and 15C, the lower mold 58 is inserted inside the innerliner 22 from the inner side of the cylinder portion 22C via the shaft member 70 with the two plate sections 66A, 66B in a folded state.

Next, as illustrated in FIG. 13A, a worker inserts his/her hand from the inner side of the cylinder portion 22C to open the two plate sections 66A, 66B, and as illustrated in FIG. 13B, the worker rotates the holding member 76 via the shaft member 70 and engages the holding member 76 so that the two plate sections 66A, 66B are held in an open state.

Figure 6:
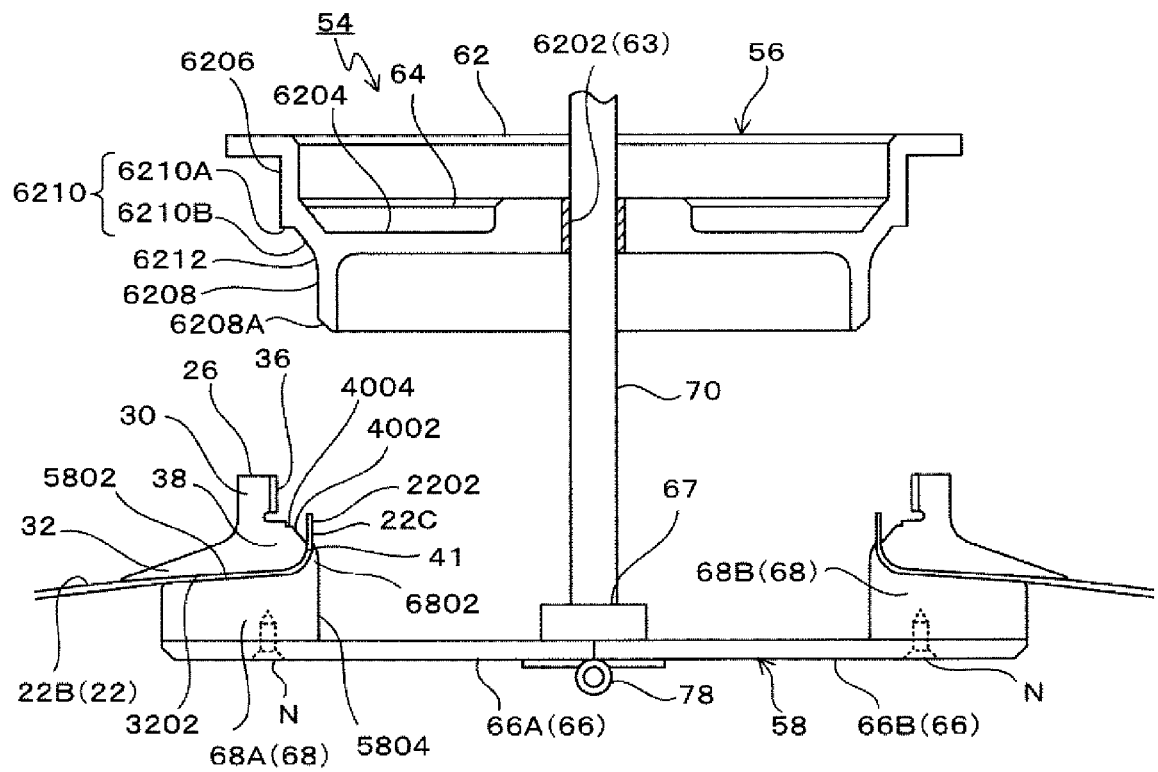
FIG. 6 is an explanatory diagram illustrating an open state of the lower mold inside the innerliner according to an embodiment.

As illustrated in FIG. 6, the inner abutting surface 5802 of the lower mold 58 is abutted against the portion of the innerliner 22 abutted against the inner skirt surface 3202.

Figure 7:
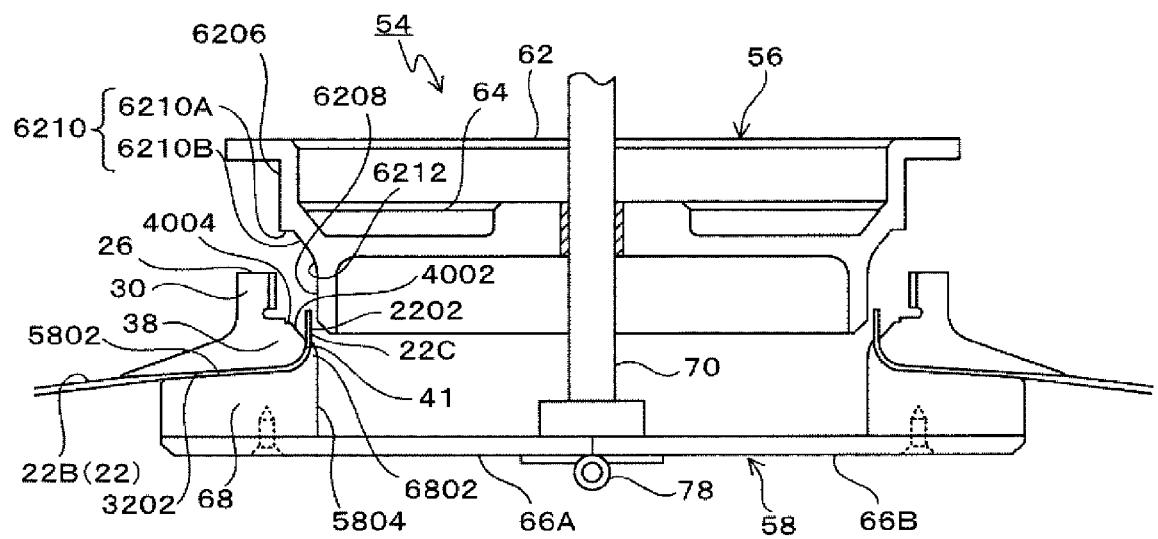
FIG. 7 is an explanatory diagram illustrating a state with the upper mold brought close to the lower mold according to an embodiment.
Figure 8:
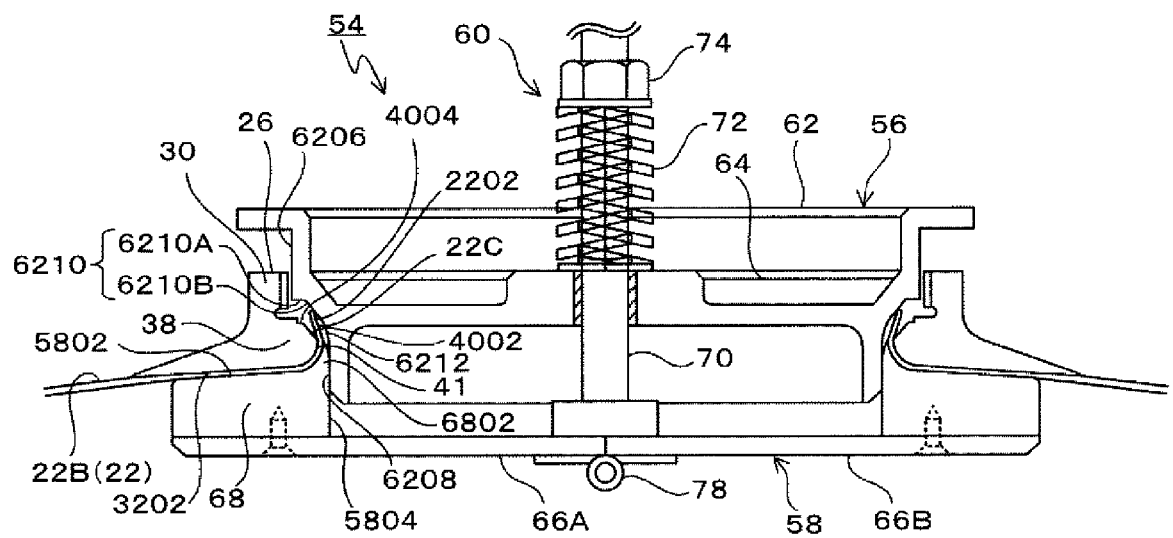
FIG. 8 is an explanatory diagram illustrating a state in which a coil spring is installed around a shaft member and a nut is engaged with the shaft member according to an embodiment.

Next, as illustrated in FIGS. 6 to 8, the shaft member 70 is inserted in the shaft insertion hole 6202 of the upper mold 56, and the upper mold side positioning cylindrical surface 6208 of the upper mold 56 is inserted into the cylinder portion 22C of the innerliner 22.

Next, the coil spring 72 and the nut 74 are disposed above the upper mold 56, and the outer abutting surface 6210 of the upper mold 56 is heated via the heating portion 64.

Then, the nut 74 is rotated to adjust the elastic force of the coil spring 72 acting in the direction for the upper mold 56 to move toward the lower mold 58.

As illustrated in FIG. 9, the elastic force of the coil spring 72 biases the upper mold 56 and the lower mold 58 in a direction toward one another, and the second abutting surface 6210B of the upper mold 56 thermally deforms the cylinder portion 22C outward in the radial direction so that the cylinder portion 22C abuts against the inclined surface 4002 of the mouthpiece 26.

Additionally, the first abutting surface 6210A of the upper mold 56 thermally deforms the end portion 2202 of the cylinder portion 22C outward in the radial direction so that the end portion 2202 of the cylinder portion 22C abuts against the annular surface 4004.

Furthermore, the elastic force of the coil spring 72 makes the inner abutting surface 5802 of the outer circumferential member 68 abut the section of the dome portion 22B of the innerliner 22 located near the cylinder portion 22C against the inner skirt surface 3202 of the mouthpiece 26.

With the elastic force of the coil spring 72 in effect, the abutment of the first abutting surface 6210A and the second abutting surface 6210B of the upper mold 56 against the annular surface 4004 and the inclined surface 4002 of the cylinder portion 22C; and the abutment of the inner abutting surface 5802 of the lower mold 58 against the inner skirt surface 3202 of a section of the dome portion 22B near the cylinder portion 22C are maintained for the required amount of time.

In such processing, by the shaft member 70 being inserted into the shaft insertion hole 6202 of the upper mold 56, and by the upper mold side positioning cylindrical surface 6208 of the upper mold 56 being inserted into the lower mold side positioning cylindrical surface 5804 of the lower mold 58, the upper mold 56 and the lower mold 58 are coaxially positioned.

After the required amount of time has elapsed, the nut 74 is operated, and the nut 74 and the coil spring 72 are removed from the shaft member 70. Then the upper mold 56 is removed.

Next, the lower mold 58 is moved downward from the mouthpiece 26 via the shaft member 70, and the holding member 76 is rotated via the shaft member 70 to put the plate sections 66A, 66B in a foldable state.

Next, the worker inserts his/her hand from the inner side of the cylinder portion 22C, folds up the two plate sections 66A, 66B, and then removes the lower mold 58 to the outside of the innerliner 22 from the inner side of the mouthpiece 26 via the shaft member 70. This completes the process.

According to the present embodiment, when the cylinder portion 22C of the innerliner 22 is abutted against the first annular surface (outer bulging surface) 40 of the mouthpiece 26 by the outer abutting surface 6210 of the upper mold 56 and thermally deformed, the projection portion 6802 is disposed to close the gap between the inner circumferential end of the outer abutting surface 6210 or a section of the upper mold side positioning outer circumferential surface 6208 following on from the inner circumferential end of the outer abutting surface 6210 and a portion of the innerliner 22 where the inner circumferential surface 41 abuts. Thus, the portion of the innerliner 22 that is thermally deformed is prevented from being displaced inward in the radial direction of the mouthpiece 26 along the first annular surface 40.

Accordingly, in a state in which the innerliner 22 and the mouthpiece 26 are attached together, sharp burrs pointing inward in the radial direction of the bulging portion 38 of the mouthpiece 26 can be prevented from forming. This is advantageous in that the aircraft water tank 10 can be efficiently manufactured without defects.

Furthermore, in a state in which the cylinder portion 22C is abutted against the first annular surface 40, the outer abutting surface 6210 extends to a section displaced inward in the radial direction of the portion of the innerliner 22 abutted against the inner circumferential end of the first annular surface 40. The section of the upper mold side positioning outer circumferential surface 6208 connected to the inner circumferential end (lower end) of the outer abutting surface 6210 is located inward in the radial direction of the cylinder portion 22C of the innerliner 22. Thus, inserting the upper mold 56 inside the cylinder portion 22C can be performed smoothly without interference from the upper end of the cylinder portion 22C. This is advantageous in that the aircraft water tank 10 can be efficiently manufactured without defects.

Additionally, even when there is an error in the inner diameter and/or outer diameter when forming the cylinder portion 22C by blow molding, the inner circumferential end of the outer abutting surface 6210 and the upper end of the upper mold side positioning outer circumferential surface 6208 are connected via the curved surface 6212. Thus, the cylinder portion 22C can be abutted smoothly against the first annular surface 40 by the outer abutting surface 6210 via the curved surface 6212. This is advantageous in that the aircraft water tank 10 can be efficiently manufactured without defects.

Furthermore, even when there is an error in the inner diameter and/or outer diameter when forming the cylinder portion 22C by blow molding, the inclined surface 6208A is formed on the lower end of the upper mold side positioning outer circumferential surface 6208. Thus, the upper mold side positioning outer circumferential surface 6208 is smoothly inserted inside the cylinder portion 22C via the inclined surface 6208A. This is advantageous in that the aircraft water tank 10 can be efficiently manufactured without defects.

Also, the outer circumferential member 68, which is the section including the lower mold side positioning inner circumferential surface 5804, is formed of a material with a lower thermal conductivity than that of the upper mold 56. This is advantageous in suppressing the heat of the outer abutting surface 6210 of the upper mold 56 transferring to the lower mold 58.

Additionally, the outer circumferential member 68 is formed of a material with a heat resistance greater than that of the innerliner 22. This is advantageous in preventing deformation and/or deterioration of the outer circumferential member 68 due to the heat of the upper mold 56.

Thus, because the heat of the outer abutting surface 6210 of the upper mold 56 cannot escape to the lower mold 58, the cylinder portion 22C of the innerliner 22 can be reliably thermally deformed to conform to the inner circumferential portion (first annular surface 40) of the cylinder-like portion 30 of the mouthpiece 26 in a short amount of time. This is advantageous in reducing the time required for forming.

Also, in the present embodiment, the lower mold 58 includes the plate portion 66 that has an outer diameter corresponding to the outer diameter of the second annular surface 3202; and an outer circumferential member 68 formed of a material with a lower thermal conductivity than that of the upper mold 56 attached to the outer circumferential portion of the plate portion 66. The lower mold side positioning inner circumferential surface 5804 and the inner abutting surface 5802 that engage with the upper mold 56 are provided on the outer circumferential member 68.

Accordingly, by this simple structure, the heat of the outer abutting surface 6210 of the upper mold 56 can be suppressed from transferring to the lower mold 58. This is advantageous in reducing the time required for forming and ensuring the durability of the innerliner 22.

Additionally, the present embodiment further includes the biasing portion 60 that sandwiches the section of the mouthpiece 26 between the outer bulging surface 40 and the inner skirt surface 3202 via the inner abutting surface 5802 and the outer abutting surface 6210. The biasing portion 60 includes the shaft insertion hole 6202 of the upper mold 56, the shaft member 70, the coil spring 72, and the nut 74.

Thus, the biasing portion 60 biases the upper mold body 62 and the lower mold 58 in a direction toward one another, the inner abutting surface 5802 of the lower mold 58 and the outer abutting surface 6210 of the upper mold 56 can sandwich the section of the mouthpiece 26 between the outer bulging surface 40 and the inner skirt surface 3202 with the innerliner 22 disposed therebetween. With this simple configuration, the innerliner 22 and the mouthpiece 26 can be reliably attached together.

In the present embodiment, the first annular surface 40 includes the inclined surface 4002 with an inner diameter that gradually increases toward the first end side in the axial direction of the mouthpiece 26; and the annular surface 4004 formed orthogonal to the axial direction that is connected to the first end of the inclined surface 4002 in the axial direction and has an outer diameter that is greater than the inner diameter of the first end of the inclined surface 4002. The outer abutting surface 6210 includes the first abutting surface 6210A that abuts the end portion 2202 of the cylinder portion 22C against the annular surface 4004; and the second abutting surface 6210B that abuts the section of the cylinder portion 22C following on from the end portion 2202 against the inclined surface 4002.

Accordingly, the end portion 2202 of the cylinder portion 22C is thermally deformed while abutted against the flat annular surface 4004 located outward of the upper end of the inclined surface 4002 in the radial direction. The inner circumferential portion of the cylinder portion 22C is more visible after being thermally deformed.

This is advantageous in making it easier to visually recognize, from the side where the female thread 36 of the mouthpiece 26 is located, whether the cylinder portion 22C has been thermally deformed along the inclined surface 4002 and whether the end portion 2202 of the cylinder portion 22C has been thermally deformed along the annular surface 4004.

Note that the present embodiment was described as having a configuration in which, in a state in which the cylinder portion 22C of the innerliner 22 is located inward of the mouthpiece 26 and in which the upper mold 56 and the lower mold 58 are brought together, the projection portion 6802 closes the entire gap between the section of the upper mold side positioning outer circumferential surface 6208 following on from the inner circumferential end of the outer abutting surface 6210 and a portion of the innerliner 22 where the inner circumferential surface 41 abuts. However, the same effect of the present technology can be achieved with a gap of approximately 1 mm between the projection portion 6802 and the portion of the innerliner 22 where the inner circumferential surface 41 of the bulging portion 38 of the mouthpiece 26 abuts. In the present technology, "the projection portion 6802 closing the gap" includes a case where a gap of approximately 1 mm remains, from the portion of the innerliner 22 where the inner circumferential surface 41 of the bulging portion 38 of the mouthpiece 26 abuts.

Note that in the present embodiment, a case has been described in which the mouthpiece side joining portion is formed as the female thread 36 and the lid side joining portion is formed as the male thread 50. However, in another embodiment of the present technology, the mouthpiece side joining portion may be formed as the male thread and the lid side joining portion may be formed as the female thread, with the lid 34 covering the cylinder-like portion 30.

Furthermore, in another embodiment, a link mechanism or an air cylinder may be used instead of the biasing portion 60. In the state illustrated in FIG. 8, the mouthpiece 26 and the upper mold 56 are supported in a manner not allowing movement upward. Thus, for example, a link mechanism or an air cylinder can be used for moving the shaft member 70 upward. The configuration of the biasing portion 60 is not limited to those of the embodiments, and a configuration from various known configurations can be employed. However, the biasing portion 60 including the coil spring 72, as in the embodiments, is advantageous in simplifying the structure of the biasing portion 60, reducing the number of parts, and reducing the cost of the device.

The invention claimed is:

1. A device for attaching a mouthpiece to an innerliner of an aircraft water tank, wherein a cylinder portion centrally located on a dome portion of an innerliner is located on an inner side of a cylinder-like mouthpiece, the cylinder portion is thermally deformed in a state of being abutted against a first annular surface that annularly expands centered on an axial center of the mouthpiece, and a section of the dome portion near the cylinder portion is abutted against a second annular surface and attached thereto via an adhesive, the second annular surface annularly expanding centered on the axial center of the mouthpiece and facing a direction opposite to that of the first annular surface, the mouthpiece comprising an inner circumferential surface connecting an inner circumferential end of the first annular surface and an inner circumferential end of the second annular surface, the device comprising:
   an upper mold; and
   a lower mold disposed below the upper mold and coaxially with the upper mold;
   the upper mold comprising
   an upper mold body and
   a heating portion;
   the upper mold body comprising
   an outer abutting surface that abuts the cylinder portion against the first annular surface and is heated by the heating portion and
   an upper mold side positioning outer circumferential surface connected to an inner circumferential end of the outer abutting surface;
   the lower mold comprising
   an inner abutting surface that abuts the section of the dome portion near the cylinder portion against the second annular surface and
   an outer circumferential portion comprising a lower mold side positioning inner circumferential surface capable of engaging with the upper mold side positioning outer circumferential surface;
   the outer abutting surface, with the cylinder portion abutted against the first annular surface, extending to a section inward in a radial direction of a portion of the innerliner where an inner circumferential end of the first annular surface abuts; and
   a projection portion being formed as a projection on an inner circumferential end of the inner abutting surface that, with the cylinder portion of the innerliner located inside the mouthpiece and with the upper mold and the lower mold being brought together, close a gap between an inner circumferential end of the outer abutting surface or a section of the upper mold side positioning outer circumferential surface following on from the inner circumferential end of the outer abutting surface and a portion of the innerliner where the inner circumferential surface abuts.

2. The device for attaching a mouthpiece to an innerliner of an aircraft water tank according to claim 1, wherein
the inner circumferential end of the outer abutting surface and an upper end of the upper mold side positioning outer circumferential surface are connected via a curved surface.

3. The device for attaching a mouthpiece to an innerliner of an aircraft water tank according to claim 1, wherein
an inclined surface that gradually decreases in an outer diameter downwards is formed connected to a lower end of the upper mold side positioning outer circumferential surface.

4. The device for attaching a mouthpiece to an innerliner of an aircraft water tank according to claim 1, wherein
the lower mold comprises
a plate portion with an outer diameter corresponding to an outer diameter of the second annular surface and
an outer circumferential member attached to an outer circumferential portion of the plate portion;
the inner abutting surface is provided on an upper surface of the outer circumferential member;
the lower mold side positioning cylindrical surface is formed as an inner circumferential surface of the outer circumferential member; and
the projection portion is formed projecting from the inner circumferential end of the upper surface of the outer circumferential member.

5. The device for attaching a mouthpiece to an innerliner of an aircraft water tank according to claim 4, wherein
the upper mold body comprises a shaft insertion hole provided in the axial center of the upper mold body;
the lower mold that comprises the plate portion and the outer circumferential member further comprises a shaft member disposed projecting from the plate portion and insertable in the shaft insertion hole allowing for movement, the shaft member coaxially positioning the lower mold and the upper mold body;
the plate portion comprises two plate sections coupled together and swingable between an open state in which the two plate sections open flat and a folded state in which the two plate sections are folded in a direction toward one another;
the outer circumferential member comprises an outer circumferential section provided on an outer circumferential portion of each of the two plate sections;
in an open state of the two plate sections, upper surfaces of the outer circumferential sections provided on the two plate sections form the inner abutting surface, inner circumferential surfaces of the outer circumferential sections form the lower mold side positioning cylindrical surface, and the projection portion is formed projecting from the inner circumferential end of the upper surface of the outer circumferential section;
the shaft member is rotatably joined to one of the two plate sections and is disposed projecting from the one of the two plate sections toward the shaft insertion hole; and
a holding member is attached to a section of the one of the two plate sections located on an opposite side to the upper mold body, the holding member rotating integrally with the shaft member, the holding member enabling the two plate sections to form a folded state and enabling the two plate sections to be held in an open state.

6. The device for attaching a mouthpiece to an innerliner of an aircraft water tank according to claim 5, further comprising
a biasing portion
that biases the upper mold body and the lower mold in a direction toward one another so that a section of the mouthpiece between the first annular surface and the second annular surface is sandwiched by the inner abutting surface and the outer abutting surface with the innerliner disposed between the section of the mouthpiece and the inner abutting surface and the outer abutting surface.

7. The device for attaching a mouthpiece to an innerliner of an aircraft water tank according to claim 2, wherein
an inclined surface that gradually decreases in an outer diameter downwards is formed connected to a lower end of the upper mold side positioning outer circumferential surface.

8. The device for attaching a mouthpiece to an innerliner of an aircraft water tank according to claim 7, wherein
the lower mold comprises
a plate portion with an outer diameter corresponding to an outer diameter of the second annular surface and
an outer circumferential member attached to an outer circumferential portion of the plate portion;
the inner abutting surface is provided on an upper surface of the outer circumferential member;
the lower mold side positioning cylindrical surface is formed as an inner circumferential surface of the outer circumferential member; and
the projection portion is formed projecting from the inner circumferential end of the upper surface of the outer circumferential member.

9. The device for attaching a mouthpiece to an innerliner of an aircraft water tank according to claim 8, wherein
the upper mold body comprises a shaft insertion hole provided in the axial center of the upper mold body;
the lower mold that comprises the plate portion and the outer circumferential member further comprises a shaft member disposed projecting from the plate portion and insertable in the shaft insertion hole allowing for movement, the shaft member coaxially positioning the lower mold and the upper mold body;
the plate portion comprises two plate sections coupled together and swingable between an open state in which the two plate sections open flat and a folded state in which the two plate sections are folded in a direction toward one another;
the outer circumferential member comprises an outer circumferential section provided on an outer circumferential portion of each of the two plate sections;
in an open state of the two plate sections, upper surfaces of the outer circumferential sections provided on the two plate sections form the inner abutting surface, inner circumferential surfaces of the outer circumferential sections form the lower mold side positioning cylindrical surface, and the projection portion is formed projecting from the inner circumferential end of the upper surface of the outer circumferential section;
the shaft member is rotatably joined to one of the two plate sections and is disposed projecting from the one of the two plate sections toward the shaft insertion hole; and a holding member is attached to a section of the one of the two plate sections located on an opposite side to the upper mold body, the holding member rotating integrally with the shaft member, the holding member enabling the two plate sections to form a folded state and enabling the two plate sections to be held in an open state.

10. The device for attaching a mouthpiece to an innerliner of an aircraft water tank according to claim 9, further comprising a biasing portion that biases the upper mold body and the lower mold in a direction toward one another so that a section of the mouthpiece between the first annular surface and the second annular surface is sandwiched by the inner abutting surface and the outer abutting surface with the innerliner disposed between the section of the mouthpiece and the inner abutting surface and the outer abutting surface.

* * * * *